United States Patent
Mejdell et al.

[11] Patent Number: 5,112,584
[45] Date of Patent: May 12, 1992

[54] METHOD FOR PRODUCTION OF MAGNESIUM CHLORIDE

[75] Inventors: Glor T. Mejdell; Hanne M. Baumann, both of Porsgrunn; Kjell W. Tveten, Skien, all of Norway

[73] Assignee: Norsk Hydro a.s., Oslo, Norway

[21] Appl. No.: 509,956

[22] Filed: Apr. 17, 1990

Related U.S. Application Data

[63] Continuation-in-part of Ser. No. 221,452, Jul. 15, 1988, abandoned.

[30] Foreign Application Priority Data

Jul. 15, 1987 [NO] Norway ............... 872945

[51] Int. Cl.⁵ .................................. C01F 5/32
[52] U.S. Cl. ........................... 423/161; 423/163; 423/497; 423/498
[58] Field of Search ............. 423/498, 497, 163, 161, 423/173

[56] References Cited

U.S. PATENT DOCUMENTS

| | | | |
|---|---|---|---|
| 2,288,610 | 7/1942 | Dean | 423/163 |
| 2,398,493 | 4/1946 | Butt et al. | 204/70 |
| 2,473,534 | 6/1949 | Lloyd | 423/163 |
| 3,479,135 | 11/1969 | Pray et al. | 423/497 |
| 3,980,753 | 9/1976 | Grill et al. | 423/163 |
| 4,100,254 | 7/1978 | Grohmann et al. | 423/497 |

FOREIGN PATENT DOCUMENTS

| | | |
|---|---|---|
| 2471351 | 6/1981 | France . |
| 21261 | of 1915 | United Kingdom . |
| 1572053 | 7/1980 | United Kingdom . |

OTHER PUBLICATIONS

Bailar, J. C. et al, "Chemistry" Academic Press, New York, 1978, pp. 419–420.

*Primary Examiner*—John Niebling
*Assistant Examiner*—Brian M. Bolam
*Attorney, Agent, or Firm*—Wenderoth, Lind & Ponack

[57] ABSTRACT

Method for production of magnesium chloride, to be used for production of magnesium, by leaching of magnesite in hydrochloric acid. A two-stage leaching process is used where in a first reactor magnesite lumps are dissolved in hydrochloric acid. The magnesium chloride containing solution is led to a second reactor, where finely ground magnesite or hydrochloric acid is added to obtain approximate equivalence between magnesium and chlorine. To precipitate the impurities an excess of magnesium oxide or magnesium hydroxide is added in one or several purification stages.

10 Claims, 1 Drawing Sheet

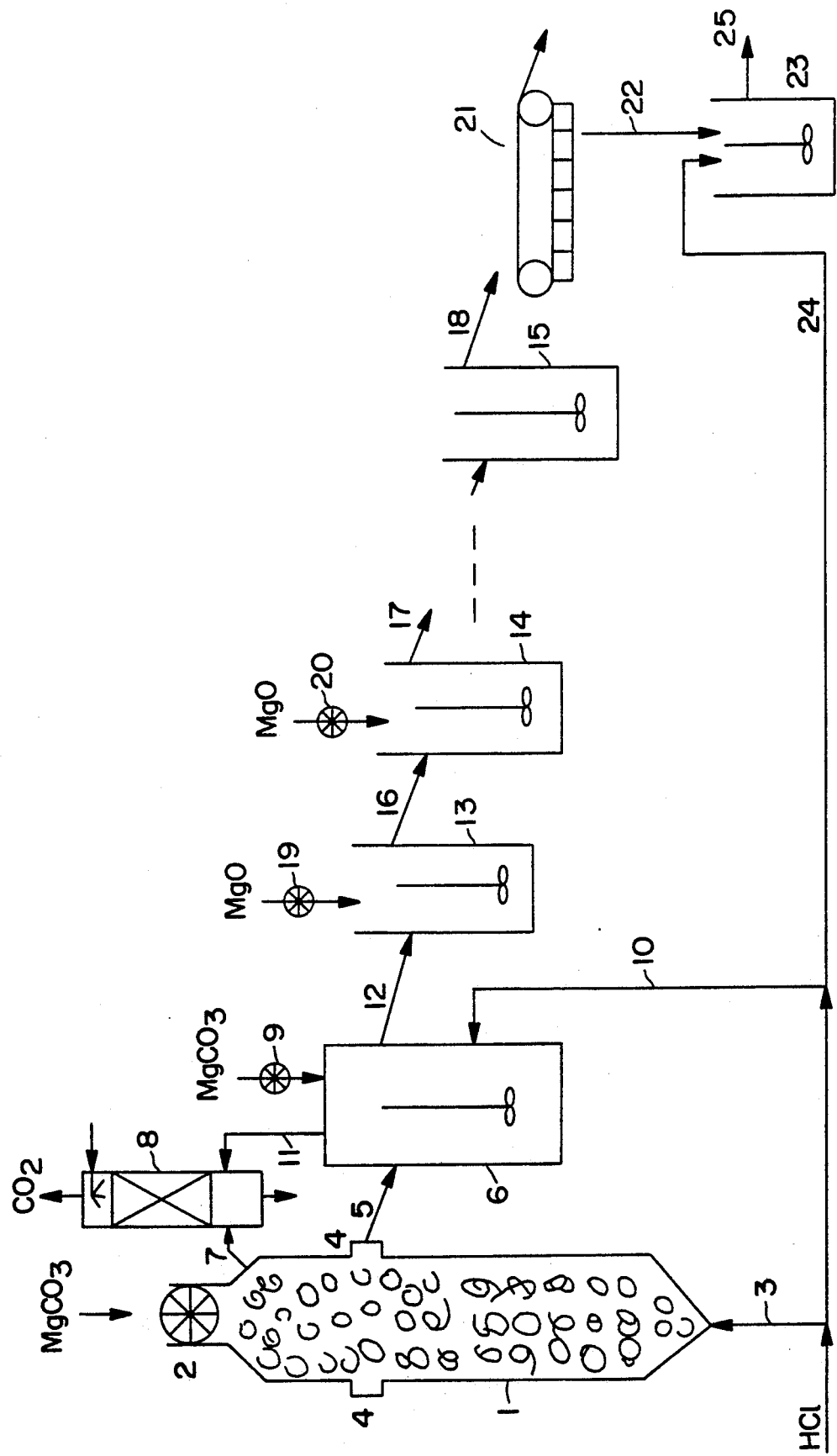

METHOD FOR PRODUCTION OF MAGNESIUM CHLORIDE

CROSS REFERENCE TO RELATED APPLICATION

This application is a continuation-in-part of Ser. No. 07/221,452 filed July 15, 1988, now abandoned.

BACKGROUND OF THE INVENTION

The present invention concerns a method for production of magnesium chloride with sufficiently high purity for production of magnesium metal, by dissolving magnesite ($MgCO_3$) in hydrochloric acid and with subsequent purification of the raw solution by precipitation of undesired impurities.

Raw magnesite ore is found in many qualities according to the place of origin and with different reactivities. Macrocrystalline magnesite can have crystalites greater than 5 mm, and cryptocrystalline magnesite can have crystalites smaller than 0.01 mm. By leaching of $MgCO_3$ the grain boundaries are first attacked, in such a way that each single crystal grain is loosened. There is therefore a great difference of reactivity between cryptocrystalline and macrocrystalline material.

It is known that magnesite has been used as a basis for production of magnesium chloride. From Hans Jedlicka: "Production of Magnesia (+99% MgO) by the Ruthner-HCl-Route", Andritz-Ruthner Industrianlagen Aktiengesellschaft, Aichholzgasse 51-53, A-1120 Vienna, pp 5-7, there is a known method for production of magnesium oxide based on leaching of magnesite with hydrochloric acid. Magnesium, as well as iron, aluminium, chromium, manganese, calcium etc. in the raw material are dissolved by the formation of chlorides.

In this process finely ground magnesite is used. The process is based on a raw material having a grain size smaller than 0.3 mm. In addition to a resource demanding and expensive grinding process, foaming problems often arise when such a finely ground material is used. Fine grains have a tendency to stick to the surface of the bubbles and form a stable foam which makes the separation of the gas from the fluid difficult. This gives low production per volume of the reactor.

According to this process possible remaining hydrochloric acid is neutralized by adding ultra-basic reactive flue-dust until a pH-value between 4 and 6 is reached. It is stated that by this pH value hydroxides of all trivalent impurities are completely precipitated. Our experience is, however, that within this pH range the precipitation of divalent heavy metals, e.g. nickel, will be insufficient.

From U.S. Pat. No. 3,980,753 there is known a process for production of magnesia of very high purity (98-99%). The brine therefore must be low in Ca and alkali metals. The magnesia is produced from a magnesite waste material which can be raw magnesite, brucite, dolomite or other magnesium containing ores. The material is dissolved in hydrochloric acid of 15-32% concentration. Impurities are precipitated by adjusting the pH to 4-9 and the purified magnesium chloride solution is thermally decomposed into magnesia and hydrochloric gas.

For removal of undesired impurities as phosphates and heavy metals, the solution is oxidized and the pH is raised to 4-9 (6-8 preferred) to precipitate the contaminants mainly as hydroxides. This pH will only bring the content of Ni down to a few (2-3) mg/kg liquid, which will be insufficient for the production of high quality magnesium metal.

As some of the raw materials used are high in calcium, the process comprises addition of sulphates in the following purification steps to remove calcium as calcium sulphate. This procedure will render a brine far too high in sulphur to be acceptable for metal production.

The process according to Jedlicka and to U.S. Pat. No. 3,980,753 are described as batch processes using a stirred reactor for leaching of the raw material. It is preferred to use a particle size less than respectively 0.3 mm and 3 mm for the raw material. When dissolving finely ground magnesite in hydrochloric acid, it should be evident that the particles must be suspended in the liquid to obtain reasonable reaction rates. Because of the mixing, a stirred reactor will operate at a concentration of unreacted HCl equal to the outgoing liquid. This concentration should be kept moderately low to avoid substantial losses of HCl by the leaving gas.

The capacity of a stirred reactor is limited by its ability to remove gas bubbles from the liquid phase. It should be evident that the reactor will overflow if the superficial gas velocity exceeds the rising velocity of the bubbles in the liquid phase. Thus the production load must be kept well below this limit. According to Perry, Chemical Engineer's Handbook, 5th edition, p. 18-71, fig.18-117 the rising velocity of bubbles in a stirred reactor will at maximum be in the order of 0.06 m/s.

SUMMARY OF THE INVENTION

The object of this invention is to obtain a process for production of magnesium chloride with high productivity per reactor surface and to obtain good separation of gas/fluid.

Another object of the invention is to obtain a sufficiently pure product with respect to impurities as for example sulphate, phosphate and nickel. It is therefore important to obtain a process with sufficient precipitation and which also gives a solution with good filterability.

A third object of the invention is to develop a process which makes it possible to use a broad range of magnesite ore, both cryptocrystalline as well as macrocrystalline. It is also an object to be able to use raw material in a broad range of size and thereby reduce the crushing and sieving to a minimum.

These objects are accomplished by a method for production of magnesium chloride for use in the production of magnesium metal, by leaching magnesite lumps, the greater part of which have a size of 5-400 mm, are fed to a first reactor and dissolved by introducing hydrochloric acid countercurrent to the magnesite, and wherein liberated $CO_2$ and acid brine flow concurrently upwards in the reactor, and wherein $CO_2$ and gaseous HCl are separated off, and where the solution leaving the first reactor is led to a second reactor where finely ground magnesite or hydrochloric acid is added to obtain approximately chemical equivalence between magnesium and chlorine, followed by precipitation of impurities from the resultant solution.

BRIEF DESCRIPTION OF THE DRAWING

The drawing schematically shows a method according to the present invention.

DETAILED DESCRIPTION OF THE INVENTION

By this invention a method is developed where magnesium chloride of sufficient quality to be used for electrolysis can be produced, using magnesite of varying reactivity and purity. To dissolve the magnesite, a two-stage process is used. Magnesite lumps are dissolved in a first reactor where hot hydrochloric acid is fed into the bottom of the reactor, and the magnesium chloride containing solution is drained off some distance below the top of the reactor, in such a way that a layer of lumps is situated above the fluid level. New magnesite lumps are fed to the upper part of the reactor. By using lumps foaming is prevented, and better separation of gas/fluid is achieved. A part of the perceptible heat in released $CO_2$ in the leaching process is used for preheating of lumps in the upper part of the reactor. Dependent on which raw material is used, one will get an excess or deficit, respectively, of hydrochloric acid in the overflow to the second reactor. The proportion between magnesium and chlorine ions is therefore adjusted in the second reactor by adding either finely ground magnesite or concentrated hydrochloric acid, in such a way that equivalence, or a slight excess of acid is obtained.

In the purification process undesired impurities (phosphates and heavy metals) are removed by increasing the pH of the solution, adding an excess of lightly calcined reactive MgO or $Mg(OH)_2$, eventually combined with oxidation of oxidizable ions with a suitable oxidation agent. It is favourable to add oxide (hydroxide) in several stages—first to neutralize free acid and thereafter to add an appropriate excess.

Other features of the invention are described in more detail below and are also shown in the figure, which schematically shows the manufacturing process.

Magnesite at least 60% of which is in the range of 5–400 mm is filled into the first leaching reactor 1 through a feeding mechanism 2 at the top of the reactor. Especially preferred are magnesite lumps of which 80–100% have a size of 5–100 mm, the rest being below 5 mm. A flow of hydrochloric acid solution with a concentration of 20–38%, preferably 28–34%, is led via a supply pipe 3, into the bottom of the first leaching reactor 1. The acid is preheated to 40°–95° C., preferably 40°–90° C. Acid brine and carbon dioxide will flow cocurrently together upwards in the reactor, the amount of gaseous $CO_2$ increasing, and the content of free acid decreasing as it flows. The higher content of HCl vapour in the gas vising from the bottom of the reactor will be absorbed in the brine, giving near equilibrium values for the gas and liquid at the outlet.

During the dissolving of magnesite the following reaction takes place:

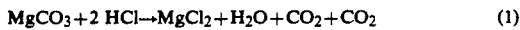

$$MgCO_3 + 2\ HCl \rightarrow MgCl_2 + H_2O + CO_2 + CO_2 \qquad (1)$$

The reaction product is drawn off through a pipe 4 some distance below the top of the reactor 1 and is led via an overflow-pipe 5 to the second leaching reactor 6.

The upper part of the reactor 1 is used for separation of fluid and gas (carbon dioxide and vapour containing HCl). The magnesite lumps in the reactor improve the separation of gas and fluid by coalescing the gas bubbles. Thus problems of foaming and droplets entrained in the waste gas are efficiently counteracted. The carbon dioxide gas which is developed by the reaction will, above the fluid level, utilize some of its heat content for preheating of the magnesite fed to the reactor. The gas is further led via a waste gas pipe 7 to an absorption tower 8 for recovering its content of hydrochloric acid vapour by absorption in water.

To avoid high contents of hydrochloric acid in the gas leaving the reactor, the acid temperature and the production load for a given quality of magnesite is chosen in such a way that at least 85% of the supplied hydrochloric acid will react to form magnesium chloride at this stage. By greater yields (above 85%) a considerable reduction of the vapour pressure of HCl above the solution is gained.

The first dissolving reactor (1), being packed with lumps of magnesite ore, contains far more solids per volume than possible in a stirred reactor. The specific surface per volume is normally inversely proportional to the particle diameter. When attacked by the acid, the coarse particles give off single crystals which will be detained in the vacancies between the lumps, increasing the total accessible surface and thus enhancing the overall reaction rate. These crystals will measure approx. 1 mm when the ore is macrocrystalline, and less than 0.01 mm when cryptocrystalline.

The packed bed of magnesite lumps appears, as one should expect, to be very efficient in coalescing the small bubbles of $CO_2$ given off to the liquid by the reaction.

Depending on the size of the grains and the velocity of gas and fluid through the reactor, a greater or smaller part of the single crystals will follow the fluid flow out through the overflow pipe 5 to the second leaching reactor 6.

The reaction rate will therefore be strongly dependent on the grain structure. Thus it is found that some cryptocrystalline magnesites with single crystals smaller than 0.01 mm will react up to 100 times faster than macrocrystalline magnesites with single crystals in the range 1–3 mm. Depending on the origin and the crystal structure of the magnesite the composition of the solution in the overflow line 5 will vary from strongly acidic solution with a small amount of magnesite grain contained by use of a macrocrystalline magnesite, to a nearly neutral solution with a large excess of microcrystals in the fluid when microcrystalline magnesite is used. Either acid or finely ground magnesite must therefore be added to the second reactor to obtain the desired composition.

If desired the temperature difference between outlet and inlet in the first leaching reactor 1 can be reduced by recirculation of the solution from the second reactor 6. This is, however, not shown in the figure.

The second reactor is a stirred tank reactor 6. Depending on the stoichiometric ratio between free acid and magnesite particles contained in the overflow line 5, finely milled (<3 mm, preferably <0.5 mm) magnesite is added via a dosage equipment 9, or concentrated hydrochloric acid is added via a supply line 10.

The feed of magnesite, and hydrochloric acid, respectively to the second reactor is adjusted in such a way that preferably more than 98% of the amounts of acid and magnesite added to the two reactors will react. The carbon dioxide gas released by the reaction is led via the gas line 11 to the common scrubber 8, while the fluid from the second reactor is led via an overflow line 12 to a first purification reactor. Magnesite contains several impurities (Fe, Ni, Mn, Si, Al, etc.) of which some are also dissolved during the leaching. To obtain a satisfactory product it is therefore necessary to precipitate the undesired contaminations from the raw solution in a form that readily can be filtered off. In the figure the purification stages are shown consisting of one or several stirred tank reactors 13,14,15 in series with overflow lines 16,17,18 between these. Heavy metals are precipitated as hydroxides in one or two stages. This is preferably done by adding finely crushed (<0.5 mm), reactive, magnesium oxide or hydroxide to the tanks via one or several feeders 19,20. These oxides are fed in an excess of 0.1-7 kg/m$^3$ solution, preferably 0.1-4 kg/m$^3$, compared to what is needed to neutralize free acid and precipitate the contaminants in the solution.

By the alkalinity which is obtained by the excess of magnesium oxide, the actual acid soluble heavy metal impurities will precipitate as hydroxides, and can be removed by filtration. If an especially low content of iron in the filtrate is desirable, this can be attained by oxidation of bivalent iron ions to trivalent by ions adding oxidation agents (sodium hypochlorite, hydrogen peroxide, etc.) to the second reactor or in the first purification stage. This is not shown in the figure.

The solution containing precipitated impurities in the last purification stage leaves this stage via an overflow line 18 to a continuous vacuum filter 21 where the solid substances are removed for disposal. For this purpose belt filters seem to be suitable, but also other types of filters (rotating drum filters, etc.) could be used.

The filtrate, a clean, but alkaline magnesium chloride solution with a concentration in accordance with the strength of the hydrochloric acid used, leaves the filter 21 via a line 22 to a stirred tank 23 where the pH of the solution is reduced to the desired value by adding hydrochloric acid through a line 24. This adjustment is necessary to avoid precipitation of magnesium oxychloride, which otherwise would precipitate by cooling and extended storage.

The product of the process, the magnesium chloride solution, will leave through overflow 25 from the tank 23 for intermediate storage.

To further illustrate the invention several experiments were carried out:

EXAMPLE 1

Air was blown through a reactor filled with magnesite lumps (5-25 mm) and partly filled with water. It was found that the superficial gas velocity could be raised to 0.8 m/s before the water level was effected.

EXAMPLE 2

In a reactor according to the invention, filled with magnesite lumps in the size of 30-50 mm, was added 4.3 m$^3$/m$^2$ h 30% hydrochloric acid at 93° C. The resulting brine in overflow contained 4.6% HCl. In the off gas was measured 30 vol% $CO_2$, 2 vol% HCl and the rest water vapour. Based on the mass balance, gas composition and temperature, the gas production was 714 m$^3$/m$^2$ h. The superficial gas velocity was 0.2 m/s.

EXAMPLE 3

The same reactor as mentioned in example 2, was filled with magnesite lumps in the size of 17-25 mm. There was added 6.8 m$^3$/m$^2$ h of 30% HCl at a temperature of 88° C. The resulting brine in overflow contained 2.38% HCl. Based on mass balance, gas composition and temperature, the superficial gas velocity was 0.35 m/s.

There were no observations that contradict the estimated superficial gas velocities in example 1.

The capacity described in example 2 is already 6 times the theoretical maximum of a stirred reactor.

EXAMPLE 4

In a pilot plant a first reactor 1 was filled with macrocrystalline magnesite lumps (5-50 mm), and 25 l/h 30% HCl at a temperature of 80° C. was fed to the bottom of the reactor. The reactor had a diameter of 250 mm and total height 1250 mm where the reaction fluid was drained off 900 mm above the bottom. The solution which was transferred to the second reactor 6, contained 4.5% free hydrochloric acid at a temperature of 85°. The second reactor 6 had a fluid volume of 44 l and was equipped with a stirrer. Finely ground magnesite was fed to the solution in such an amount that the solution leaving the tank contained 0.5% free HCl. The solution also contained 400 mg Fe/l, 5 mg Ni/l and 23 mg P/l. The purification stages consisted of three stirred tanks in series, each of 10 l. To the first purification tank 13 about 100 g/h lightly calcined MgO was supplied to bring the solution up to a pH sufficiently high for precipitating trivalent iron oxide. To the second purification tank 14 further 80 g MgO/h was added. Furthermore approximately 50 ml/h 10% $H_2O_2$ was added to this tank, sufficiently to oxidize all iron to trivalent iron. The last precipitation tank's only function was to increase the residence time and had no further inlets. The suspension was filtered on a small rotating filter, and about 400 ml/h 30% HCl was added to the filtrate to bring the pH of the solution down to about 7. The resulting solution contained 33.5% $MgCl_2$, while the content of impurities, as for example Fe, Ni and P was reduced to respectively <10, <1 and <0.5 mg/l.

EXAMPLE 5

The same pilot plant as described in Example 1 was used. The first leaching reactor was filled with cryptocrystalline magnesite lumps (5-50 mm) and fed with 20 l/h 30% HCl at 70°. The solution which was drained off from this reactor, was nearly neutral (<0.05% free HCl), but was white as milk because of the unreacted grains of magnesite entrained in the solution. To the second leaching reactor 6, 5 l 30% HCl was added per hour. The solution from this tank was approximately clear and contained about 0.5% free acid. The solution was further treated as in Example 1 and gave a product which contained <10 mg/l Fe and 0.5 mg/l Ni. The resulting solution contained 33.5% $MgCl_2$.

We claim:

1. A method for production of magnesium chloride for use in production of magnesium metal, by leaching magnesite in hydrochloric acid, which consists essentially of feeding magnesite-containing lumps, the greater part of which have a size of 5-400 mm, to a first reactor to form a packed bed of the lumps, dissolving the magnesite by introducing hydrochloric acid into the first reactor countercurrent to the lumps, and wherein liberated $CO_2$ and acid brine flow cocurrently upwards in the first reactor, separating $CO_2$ and gaseous HCl off from the first reactor, introducing the resultant magnesium chloride-containing solution from the first reactor into a second reactor, adding either magnesite of a grain size less than 3 mm or hydrochloric acid to the second reactor to obtain approximately chemical equivalence between magnesium and chlorine, and precipitating impurities from the resultant solution.

2. The method according to claim 1, wherein the magnesite added to the second reactor has a grain size less than 0.5 mm.

3. The method according to claim 1, wherein 60-100% of the magnesite-containing lumps fed to the first reactor have a size of 5-100 mm, any remainder of said lumps having a size less than 5 mm.

4. The method according to claim 3, wherein 80-100% of the magnesite-containing lumps fed to the first reactor have a size of 5-100 mm.

5. The method according to claim 1, wherein the hydrochloric acid introduced into the first reactor is 20-38% hydrochloric acid with a temperature 40-95° C.

6. The method according to claim 1, wherein the magnesium chloride-containing solution in the first reactor is drained off from the first reactor below the top of the packed bed, and the packed bed above the solution acts as a packed tower for off gas scrubbing.

7. The method according to claim 1, wherein the impurities are precipitated as hydroxides in one or more purification stages by adding 0.1-7 $kg/m^3$ magnesium oxide or an equivalent amount of magnesium hydroxide, in excess of the amount which is consumed for neutralization of free acid.

8. The method according to claim 7, wherein the impurities are heavy metal.

9. The method according to claim 7, wherein 0.1-4 $kg/cm^3$ of the magnesium oxide or an equivalent amount of the magnesium hydroxide is added.

10. The method according to claim 1, which further comprises filtering the precipitated impurities from the solution and then adjusting the pH of the solution by adding HCl.

* * * * *